March 15, 1932. D. PYZEL 1,849,357
PRODUCING AMMONIA
Filed Sept. 26, 1928
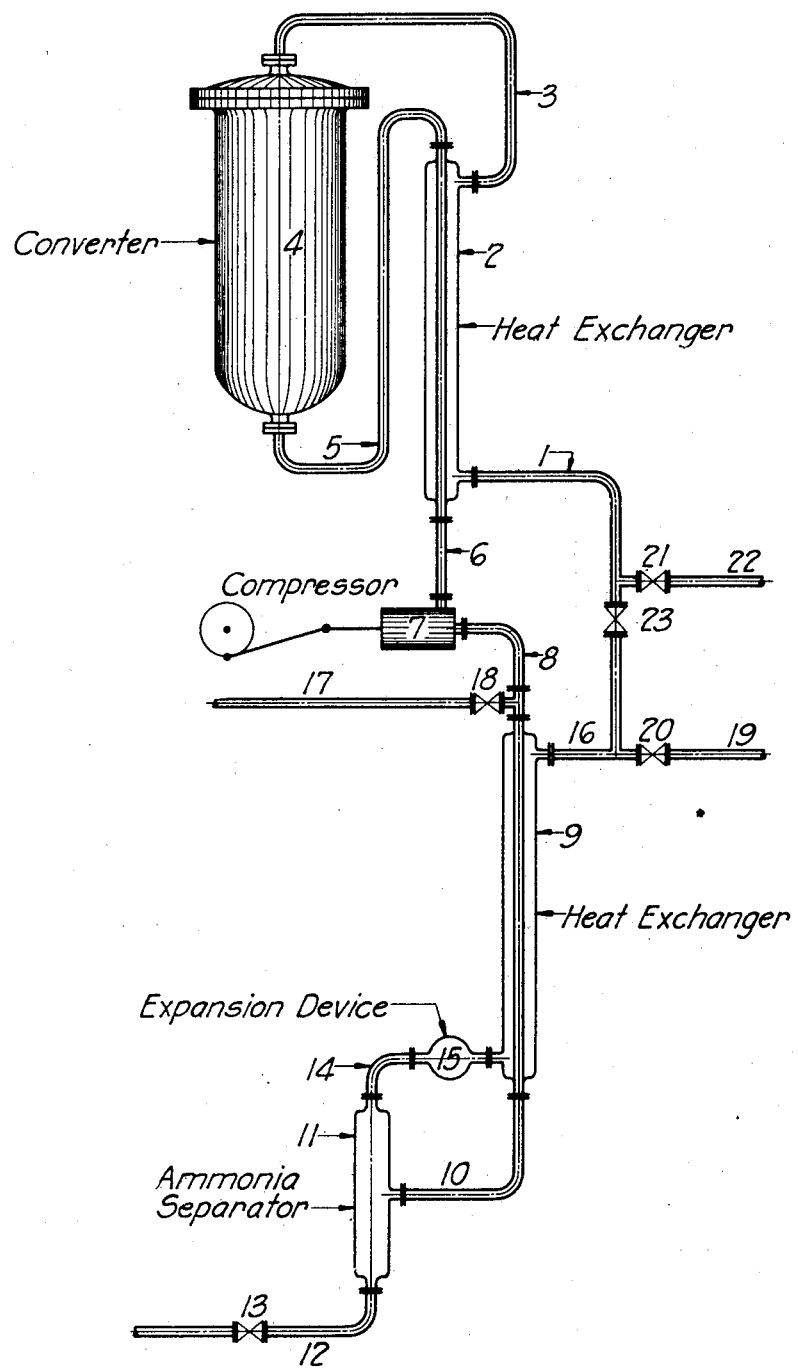
INVENTOR
Daniel Pyzel
By: [signature]
Attorney Patented Mar. 15, 1932

1,849,357

UNITED STATES PATENT OFFICE

DANIEL PYZEL, OF PIEDMONT, CALIFORNIA, ASSIGNOR TO SHELL DEVELOPMENT COMPANY, OF SAN FRANCISCO, CALIFORNIA, A CORPORATION OF DELAWARE

PRODUCING AMMONIA

Application filed September 26, 1928. Serial No. 308,511.

This invention relates to the production of ammonia by the catalytic conversion of a mixture of nitrogen and hydrogen.

It is an object of this invention to provide a process whereby the operating conditions for the catalytic converter and the ammonia separating elements can be varied independently.

Further objects and advantages will appear from the following description of my invention.

In the production of ammonia by catalytic treatment of a mixture of hydrogen and nitrogen, only a fraction of these gases can be converted in one passage through the catalytic converter. It has been usual, therefore, to remove such ammonia as has been formed and subject the remaining nitrogen and hydrogen mixture to further treatment.

As the pressure required for efficient conversion is considerable, the usual practice has been to merely cool the rich gas leaving the converter, to a temperature at which the ammonia can be easily separated by liquefaction or absorption.

Uniform pressure is thus maintained on all the elements of the plant, only such differences of pressure being caused to exist as will be required to overcome the frictional resistance encountered by the circulating gases in the apparatus.

The ammonia is thus liquefied or absorbed at substantially the same pressure as is maintained on the catalytic converter. Since the pressures used by the various processes are very high, ranging from 200 atmospheres to as high as 1000 atmospheres, efficient removal of ammonia has given very little difficulty.

Recently more efficient catalysts have been discovered, which allow a decrease in the pressure required on the catalytic converter, one catalyst giving economical conversion at pressures as low as sixty atmospheres.

While these lower pressures offer many advantages in the way of simplified construction of catalytic converter apparatus, they introduce considerable difficulties at the ammonia separating elements of the plant.

Now I have found that these difficulties can be eliminated and yet the advantages of low pressure conversion retained by the use of the process hereinafter described.

Essentially the process embodies the following steps: contacting a hydrogen and nitrogen mixture at a certain pressure and temperature with a catalytic agent; decreasing the temperature of the converted gas to a temperature suitable for the compression of the gas; compressing the gas to a higher pressure sufficient for the efficient removal of the ammonia contained in the gas; further decreasing the temperature of the compressed gas to a temperature at which the ammonia is liquefied or can be absorbed; separating the liquid ammonia or the enriched absorbent from the hydrogen and nitrogen gas; and expanding the remaining hydrogen and nitrogen gas mixture to a pressure suitable for further catalytic treatment.

The process is illustrated in a simplified way in the accompanying diagram.

The nitrogen hydrogen mixture at a suitable pressure, for instance 80 atm., passes through conduit 1, through heat exchanger 2 and through conduit 3 into the catalytic converter 4, where a fraction of the gases is converted into ammonia. The rich gas flows from the converter through conduit 5, is then cooled in the heat exchanger 2 to a temperature suitable for the compression of the gas. The cool gas flows through conduit 6, into the compressor 7 where the gas is compressed to the pressure required by the ammonia separator, for instance 140 to 200 atmospheres. The compressed gas is then again subjected to cooling in the heat exchanger 9 connected to the compressor by conduit 8. The gas issuing from heat exchanger 9 passes through conduit 10 into the ammonia separator 11, where the liquid ammonia, condensed due to the combined effect of the low temperature produced in the heat exchanger 9, and the high pressure maintained on the gas, is separated from the hydrogen and nitrogen gas mixture. The liquefied ammonia is removed through the conduit 12 controlled by the valve 13.

The hydrogen and nitrogen gas mixture remaining after separation of the ammonia leaves the separator 11 through conduit 14 and the expansion valve or other expansion device at 15. Here the pressure of the gas is allowed to decrease to such a value as is required by the subsequent treatment of this gas. For instance the gas can be returned for further catalytic treatment to the converter, as its pressure after expansion can be adjusted to the pressure required for this purpose. In that case the expanded gas passes directly from the heat exchanger 9 through conduit 16 and valve 23 into the conduit 1 and thence on to the converter. Or part or all of the gas may be removed from the system through conduit 19 and valve 20, and if so desired again subjected to a similar treatment.

Fresh hydrogen and nitrogen mixture is obtained under pressure from some source, not shown, through conduit 22 controlled by valve 21, or if desired this gas can be added at some other stage of the process, for instance, through conduit 17 and valve 18.

The expansion of the stripped gases issuing from the ammonia separator is carried out, either by the use of an expansion valve or by expansion under the performance of external work, and in such a manner that full use is made of the cooling effect obtainable from this expansion for the purpose of cooling the rich gas on its way to the ammonia separator.

While a diagrammatic representation of this process is shown on the attached drawing, it should be understood that other arrangements of heat exchangers and other units may be found suitable to carry out the method and obtain the results of this invention, and I do not intend to limit myself to the particular arrangement shown; it should further be understood that the arrangement shown is purposely simplified.

In actual operation additional heating and cooling means must be provided. These may be located, for instance, in lieu of the conduits 1, 3, 5, 6, 8 and 10. The particular number and arrangement of these devices is not pertinent to the process of this invention and are therefore not shown.

I claim as my invention:

1. A process of producing ammonia by the catalytic conversion of a mixture of nitrogen and hydrogen, comprising: passing the mixture under pressure over a catalyst, subjecting the partly converted mixture of gases to a pressure substantially higher than and independent of the pressure maintained during the conversion, cooling the mixture and removing the ammonia formed, while maintaining the increased pressure, expanding the mixture to the lower pressure prevailing during the conversion, passing the mixture again over the catalyst, and adding fresh mixture to maintain constant conditions of pressure in the cycle.

2. A process of producing ammonia by the catalytic conversion of a mixture of nitrogen and hydrogen, comprising: passing the mixture under pressure over a catalyst, subjecting the partly converted mixture of gases to a pressure substantially higher than and independent of the pressure maintained during the conversion, cooling the mixture by heat exchange with the gases from which the ammonia has been removed, and removing from the mixture the ammonia formed, while maintaining the increased pressure, expanding the mixture to the lower pressure prevailing during the conversion, passing the mixture again over the catalyst, and adding fresh mixture to maintain constant conditions of pressure in the cycle.

3. A process of producing ammonia by the catalytic conversion of a mixture of nitrogen and hydrogen, comprising: passing the mixture under pressure over a catalyst, subjecting the partly converted mixture of gases to a pressure substantially higher than and independent of the pressure maintained during the conversion, cooling the mixture by heat exchange with the gases, from which the ammonia has been removed, immediately after their expansion, and removing from the mixture the ammonia formed, while maintaining the increased pressure, expanding the mixture to the lower pressure prevailing during the conversion, passing the mixture again over the catalyst and adding fresh mixture to maintain constant conditions of pressure in the cycle.

4. A process of producing ammonia by the catalytic conversion of a mixture of nitrogen and hydrogen, comprising: passing the mixture under pressure over a catalyst, subjecting the partly converted mixture of gases to a pressure substantially higher than and independent of the pressure maintained during the conversion, cooling the mixture and removing the ammonia formed, while maintaining the increased pressure, expanding the mixture to the lower pressure prevailing during the conversion and subjecting the mixture again to a similar treatment in a subsequent stage.

5. A process of producing ammonia by the catalytic conversion of a mixture of nitrogen and hydrogen, comprising: passing the mixture under pressure over a catalyst, subjecting the partly converted mixture of gases to a pressure substantially higher than and independent of the pressure maintained during the conversion, cooling the mixture and removing the ammonia formed, while maintaining the increased pressure, expanding the mixture to the lower pressure prevailing during the conversion and subjecting the mixture repeatedly to a similar treatment, in subsequent stages.

6. A process of producing ammonia by the catalytic conversion of a mixture of nitrogen and hydrogen, comprising: passing the mixture under pressure over a catalyst, subjecting the partly converted mixture of gases to a pressure substantially higher than and independent of the pressure maintained during the conversion, cooling the mixture and removing the ammonia formed, while maintaining the increased pressure, expanding the mixture to the lower pressure prevailing during the conversion, passing part of the mixture again over the catalyst, and subjecting the other part to a similar treatment in a subsequent stage.

7. A process of producing ammonia by the catalytic conversion of a mixture of nitrogen and hydrogen, comprising: passing the mixture under pressure over a catalyst, subjecting the partly converted mixture of gases to a pressure substantially higher than and independent of the pressure maintained during the conversion, cooling the mixture by heat exchange without additional external refrigeration and removing from the mixture the ammonia formed, while maintaining the increased pressure, expanding the mixture to the lower pressure prevailing during the conversion, passing the mixture again over the catalyst and adding fresh mixture to maintain constant conditions of pressure in the cycle.

8. A process of producing ammonia comprising the steps of compressing a gaseous mixture of nitrogen and hydrogen containing ammonia, cooling the gaseous mixture and removing ammonia under the imposed pressure, expanding the residual gas, from which ammonia has been removed, to a lower pressure, partially converting said residual gas to ammonia by catalysis under this lower pressure and further treating the gaseous mixture again in the manner set out above thereby completing the cycle.

9. A process of producing ammonia as described in claim 8 wherein fresh mixtures of hydrogen and nitrogen are continuously added to the expanded residual-gas under a pressure equal to that of the residual gas.

10. A process of producing ammonia by the catalytic conversion of a mixture of nitrogen and hydrogen, comprising: passing the mixture over a catalyst at a relatively low pressure of the order of 50–150 atmospheres, subjecting the partly converted mixture of gases to an independent pressure at least 50 atm. higher, cooling the mixture by heat exchange without additional external refrigeration and removing from the mixture the ammonia formed, while maintaining the increased pressure, expanding the mixture to the lower pressure prevailing during the conversion, passing the mixture again over the catalyst and adding fresh mixture to maintain constant conditions of pressure in the cycle.

11. A process of producing ammonia by the catalytic conversion of a mixture of nitrogen and hydrogen, comprising: passing the mixture over a catalyst at a relatively low pressure of the order of 100 atm., subjecting the partly converted mixture of gases to an independent pressure of the order of 200 atm., cooling the mixture by heat exchange without additional external refrigeration and removing from the mixture the ammonia formed, while maintaining the increased pressure, expanding the mixture to the lower pressure prevailing during the conversion, passing the mixture again over the catalyst and adding fresh mixture to maintain constant conditions of pressure in the cycle.

12. A process of producing ammonia comprising the steps of compressing a gaseous mixture of nitrogen and hydrogen containing ammonia to a pressure of the order of 200 atm., cooling the gaseous mixture and removing ammonia under the imposed pressure, expanding the residual gas, from which ammonia has been removed, to a lower pressure of the order of 100 atm., partially converting said residual gas to ammonia by catalysis under this lower pressure and further treating the gaseous mixture again in the manner set out above thereby completing the cycle.

In testimony whereof, I have hereunto set my hand.

DANIEL PYZEL.